(12) United States Patent
Krieger (10) Patent No.: US 9,004,433 B2
(45) Date of Patent: Apr. 14, 2015

(54) FOLDING TRAVEL SUPPORT DEVICE AND METHOD FOR USING THE SAME

(71) Applicant: John A. Krieger, Danbury, CT (US)

(72) Inventor: John A. Krieger, Danbury, CT (US)

( * ) Notice: Subject to any disclaimer, the term of this patent is extended or adjusted under 35 U.S.C. 154(b) by 21 days.

(21) Appl. No.: 14/098,574

(22) Filed: Dec. 6, 2013

(65) Prior Publication Data

US 2014/0158844 A1 Jun. 12, 2014

Related U.S. Application Data

(60) Provisional application No. 61/735,613, filed on Dec. 11, 2012.

(51) Int. Cl.
| | |
|---|---|
| *A47K 1/08* | (2006.01) |
| *B60N 3/10* | (2006.01) |
| *A47G 23/00* | (2006.01) |
| *A47G 23/02* | (2006.01) |

(52) U.S. Cl.
CPC ............... *B60N 3/103* (2013.01); *A47G 23/00* (2013.01); *A47G 23/0216* (2013.01); *A47G 23/0225* (2013.01); *A47G 23/0208* (2013.01); *B60N 3/102* (2013.01); *Y10S 224/906* (2013.01)

(58) Field of Classification Search
CPC .......... B60N 3/102; B60N 3/103; B60N 3/10; A47F 5/11; A47G 23/0208; A47G 23/0216; A47G 23/0616; A47G 23/0225; A47G 23/0241; B65D 5/4266
USPC .............. 248/311.2, 300, 215, 459, 152, 301, 248/174; 211/73; 224/482, 444, 276, 906, 224/226; 206/162, 170, 175; 108/165; 220/738
See application file for complete search history.

(56) References Cited

U.S. PATENT DOCUMENTS

| | | | | |
|---|---|---|---|---|
| 1,915,958 | A * | 6/1933 | Skirrow | 248/300 |
| D164,692 | S | 10/1951 | Kelley | |
| 2,628,054 | A | 2/1953 | Fazakerley | |
| 2,649,270 | A | 8/1953 | Franks | |
| 2,770,513 | A | 11/1956 | Brown | |
| 2,831,647 | A | 4/1958 | Mackay | |
| 2,971,654 | A * | 2/1961 | Whorton | 211/73 |
| 3,031,162 | A | 4/1962 | Whorton | |
| 3,051,428 | A | 8/1962 | Schult | |
| 3,125,969 | A | 3/1964 | Tallent | |
| 3,128,984 | A * | 4/1964 | Palm | 248/311.2 |
| 3,145,848 | A * | 8/1964 | Wood | 211/88.01 |
| 3,744,704 | A | 7/1973 | Struble | |
| D228,304 | S | 9/1973 | Lerew | |
| 4,530,480 | A | 7/1985 | Pratt | |
| D287,789 | S | 1/1987 | Johnson | |

(Continued)

FOREIGN PATENT DOCUMENTS

GB 2364036 A 1/2002

*Primary Examiner* — Christopher Garft
(74) *Attorney, Agent, or Firm* — William F. Nixon; Millen, White, Zelano & Branigan, P.C.

(57) ABSTRACT

A folding support device and methods for constructing and using the same are provided by the present invention. A foldable support member contains a series of hinge sections and support and stress limiting members. Construction is provided enabling the device to safely collapse and stow while traveling, but to unfold and provide a gripping tension on both a support member and a support device in a reliable manner. Force analysis is provided securing the item in an upright way via a force transfer generated by the supported weight itself.

8 Claims, 9 Drawing Sheets

(56) References Cited

U.S. PATENT DOCUMENTS

| | | | |
|---|---|---|---|
| 4,765,581 A * | 8/1988 | Wallace et al. | 248/311.2 |
| 4,779,831 A * | 10/1988 | Anderson | 248/311.2 |
| 4,887,784 A | 12/1989 | Kayali | |
| 4,893,773 A * | 1/1990 | Fujimoto | 248/311.2 |
| 4,984,722 A | 1/1991 | Moore | |
| 5,060,581 A * | 10/1991 | Malinski | 108/44 |
| 5,280,870 A | 1/1994 | Chick et al. | |
| 5,558,026 A * | 9/1996 | Seibert | 108/44 |
| 5,624,095 A * | 4/1997 | Zissu | 248/231.81 |
| 5,704,671 A * | 1/1998 | van der Wal et al. | 294/31.2 |
| 5,738,217 A | 4/1998 | Hunter | |
| 5,833,194 A | 11/1998 | Jones et al. | |
| 5,845,585 A * | 12/1998 | Meeus et al. | 108/44 |
| 6,045,017 A | 4/2000 | Connell | |
| 6,047,937 A | 4/2000 | Huang | |
| 6,227,509 B1 | 5/2001 | Plocher et al. | |
| 6,230,882 B1 | 5/2001 | Wischusen, III | |
| 6,371,428 B1 * | 4/2002 | Zorich et al. | 248/311.2 |
| 6,409,137 B1 | 6/2002 | Tran | |
| 6,457,421 B1 * | 10/2002 | Apichom | 108/44 |
| 6,705,579 B2 | 3/2004 | Yamada | |
| 6,883,765 B2 | 4/2005 | Lozano et al. | |
| D536,615 S | 2/2007 | Dziaba et al. | |
| 7,363,865 B2 * | 4/2008 | Rubenstein | 108/44 |
| 8,091,702 B1 * | 1/2012 | Keip | 206/171 |
| 8,459,481 B2 * | 6/2013 | Arkin | 220/6 |

\* cited by examiner

FOLDING TRAVEL SUPPORT DEVICE AND METHOD FOR USING THE SAME

BACKGROUND OF THE INVENTION

1. Field of the Invention

The present invention relates to a folding travel support device and method for using the same. More particularly, the present invention provides a short use readily disposable compact support platform for use during travel, particularly but not limited to travel on public conveyances.

2. Description of the Related Art

There are many instances when users routinely have a beverage, food, or other item that requires a stable platform when not in an active-carry use, but where there is no such platform available. For example, trying to read on the bus or train while commuting in transit while balancing a beverage in-hand or on a non-suitable surface is both a constant annoyance and dangerous.

Known are permanently affixed-fold-down cup holders in planes, automobiles, and trains. Unfortunately, these are often not present on commuter-specific transportation modes—commonly a metro-type train—in view of their cost, ease of breakage, difficulty in fixing (following breakage), and for other economical and practical reasons.

As a result, no stable platform is available to a user. There currently exists no device that removably attaches to multiple environments, stably supports cups, cans or other items, and can be folded flat in a compact shape for transport in a briefcase, backpack, jacket pocket, for otherwise for convenient transportation and storage when not in use.

A number of extant patents provide for an ability to hold a container and be folded away when not in use, but these all involve permanent attachment to the vehicle. These include U.S. Pat. Nos. 2,649,270 and 4,530,480.

U.S. Pat. No. 3,051,428 shows a mechanism that can be removably attached to a ladder through a clamping device. The flexible nature of the mount on this device provides auto-leveling when stationary, but would prove dangerously unstable when applied to a moving structure such as a bus or a train.

Likewise, U.S. Pat. No. 4,887,784 attached to a supporting member with a clamp and a series of thumbscrews provided for adjustability. These attachment and adjustment elements are rigid and bulky, and consequently, cannot be easily folded flat for storage in a brief case or jacket pocket when not in use.

U.S. Pat. Nos. 4,984,722 and 5,280,870 both show adjustable cup holders that fold, and provides removability, but contain a number of moving parts, hinges, pins, and the like that require expensive manufacture and assembly.

U.S. Pat. No. 5,833,194 shows a cup holder that can be affixed to a car window, but is not suitable for a wide variety of differing mount position, such as would be required for someone facing a number of differing configurations. Again, the design consists of a plethora of manufactured parts.

Likewise, U.S. Pat. No. 6,409,137 is designed specifically for attachment to the folded tray table of an airline seat, and is not suitable for other public transportation applications.

Alternately there have been a number of inventions relating to container carriers that can be manufactured from folded, stamped, stiff or corrugated cardboard, but these have been designed to be carried by hand for transportation of multiple containers, rather than to be used to create a stable platform for use.

U.S. Pat. No. 3,744,704 is a typical example of this type. It provides easy carriage of multiple cans or bottles, but does not provide a way to support them while drinking and reading a paper, or other activity that requires the use of the user's hands. U.S. Pat. Nos. 5,738,217 and 6,230,882 accomplish similar goals through differing methods.

These references do not combine (1) the ability to be quickly and removably mount to a variety of configurations, (2) the ability to stably support a beverage container or other item and (3) the ability to be manufactured cheaply by substantially stamping and folding a sheet of stiff, flat material such as paper, cardboard, or plastic.

SUMMARY OF THE INVENTION

In response, it is now recognized that there is a need to construct a device that remains rigid and stable when in use, securely retains an item being held, and yet is non-damaging in use, is removable and stow-able in a reduced profile. Further, the device may be constructed from a single sheet of material.

According to one aspect of the present invention, the device includes the properties of remaining rigid and stable when in use, securely holding the item in question, and folding into a relatively flat state for easy storage and transportation. The flat fold feature is required to make it easy store when not in use. The geometry of the hinging that is required to hold the device fast when hung over an attachment point, like a hand rail or the back of a train or bus seat necessarily has previously prevented the folding required to get the device to fold flat. Likewise the hinging required to hold the beverage or other item gripped securely in the system, yet be removable with a single hand, and non-pivotally and non-collapsible, while on the support, but that will loosen when the item is lifted off the support, and still fold flat is disclosed.

The disclosed invention provides a folding support device and methods for constructing and using the same. A foldable support member contains a series of hinge sections and supporting and motion-limiting members. Construction is provided enabling the device to safely collapse and stow while traveling, but to unfold and provide a gripping tension on both a support member and the supported item in a reliable manner. Force analysis is provided securing the item in an upright way via a force transfer generated by the supported weight itself.

According to another aspect of the present invention there is proposed a device and method wherein flexible hinge limiters are provided that operably employ the weight of an item-being-supported to further close the panels of the device over both an attachment point on a support and around the item being held in the manner discussed.

Thus, a folding travel support device is disclosed that is operably securable to an external fixed member. The system includes a substantially, flat rigid backing panel. The device also includes a top panel fixed hingedly to the backing panel. The device also includes a first limiting mechanism which prevents a hinge between the backing panel and the top panel from opening beyond a certain angle. The device also includes a main panel fixed hingedly to the top panel. The device also includes a flexible member fixed to the backing panel and the main panel such that a force provided by the fixed member will pull the backing panel toward the main panel. The device also includes a bottom panel fixed hingedly to the main panel. The device also includes a second limiting mechanism which prevents a hinge between the main panel and the bottom panel from opening beyond a certain angle. The device also includes a facing panel fixed hingedly to the bottom panel. The device also includes a flexible member fixed to the facing panel and the main panel such that a force provided by an item to be held will pull the facing panel toward the main panel, thereby trapping the item.

A method of using the device is also disclosed. The method includes separating the backing panel from the main panel. The method also includes positioning the device such that the backing panel falls on one side of a fixed element in an environment and the main panel falls on the other side of the fixed element. The method also includes allowing the device to rest on top of the fixed element, thereby causing the backing panel to be pulled tightly against one side of the fixed element and securing the system to the fixed element. The method also includes separating the facing panel from the main panel. The method also includes placing the item to be held to act upon the bottom panel of the device and to cause a resulting moment to pull the facing panel tightly against the item.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Reference will now be made in detail to embodiments of the invention. Wherever possible, same or similar reference numerals are used in the drawings and the description to refer to the same or like parts or steps. The drawings are in simplified form and are not to precise scale. For purposes of convenience and clarity only, directional (up/down, etc.) or motional (forward/back, etc.) terms may be used with respect to the drawings. These and similar directional terms should not be construed to limit the scope of the invention in any manner.

Referring now to FIGS. 1-5, where related embodiments of the proposed device are operative of a number of functionally hingedly secured panels and elements according to the following description.

A backing panel 1 is hinged to a top panel 2, and thereafter to a main panel 3, as shown. Thereafter, main panel 3 is hingedly secured to a bottom panel 4, which may be formed from one or a plurality of sub-bottom panels 4(2) to provide a further compact shape. Bottom panel 4 is operably secured to a facing panel 5.

There are a plurality of operably secured force transmission members noted as 'flexible members' (in that they flex for folding but will transmit force as noted under tension (e.g., not stretchy). A plurality of bottom flexible members 6, 6 extend between the panel members shown on either side thereof and are secured at respective attachment points 8,8,8, 8. This securement at points 8, may be fixed or optionally releasable for replacement upon breakage. A plurality of top flexible members 7, 7 extends between the panel members shown on either side thereof, and are secured at respective attachment points 8,8,8,8, as shown. Again, this securement at points 8, may be fixed or optionally releasable for replacement upon breakage.

Pairs of opposing top and bottom flex members 9,9,9,9 serve as hinge action limiters between the panels as shown in each embodiment. It will be recognized, that additional flex limiting members 9 may be provided in the disclosed embodiment to flexibly limit the travel of front panel 5 relative to bottom panel(s) 4, as shown.

It will be further understand that each hinge is provided as a linear-type hinge point 10 for purposes of discussion, but is not limited to the drawing views. Such hinge points 10 may be in the form of tape, flexible members, multiple press or crimped sections, or in any other of a number of manners known to those of skill in the hinge-creation arts. Ideally, the proposed device may be initially cut and hinge-crimped from a single sheet of materials, but the invention is not so limited thereto.

Figure 6:
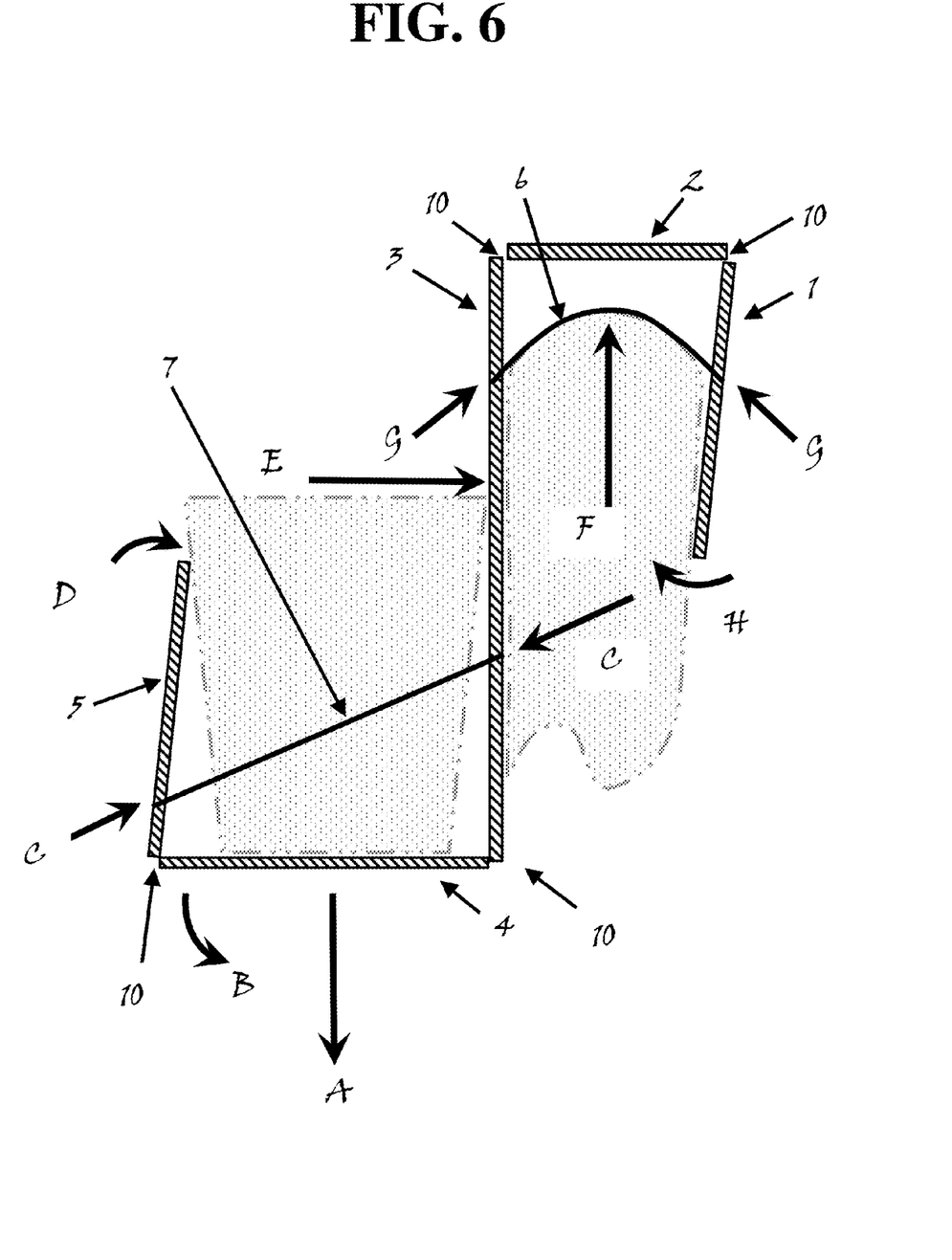
FIG. 6 is a side elevation view of an exemplary force diagram noting the proposed device relative to a support surface and supporting weight.
Figure 7:
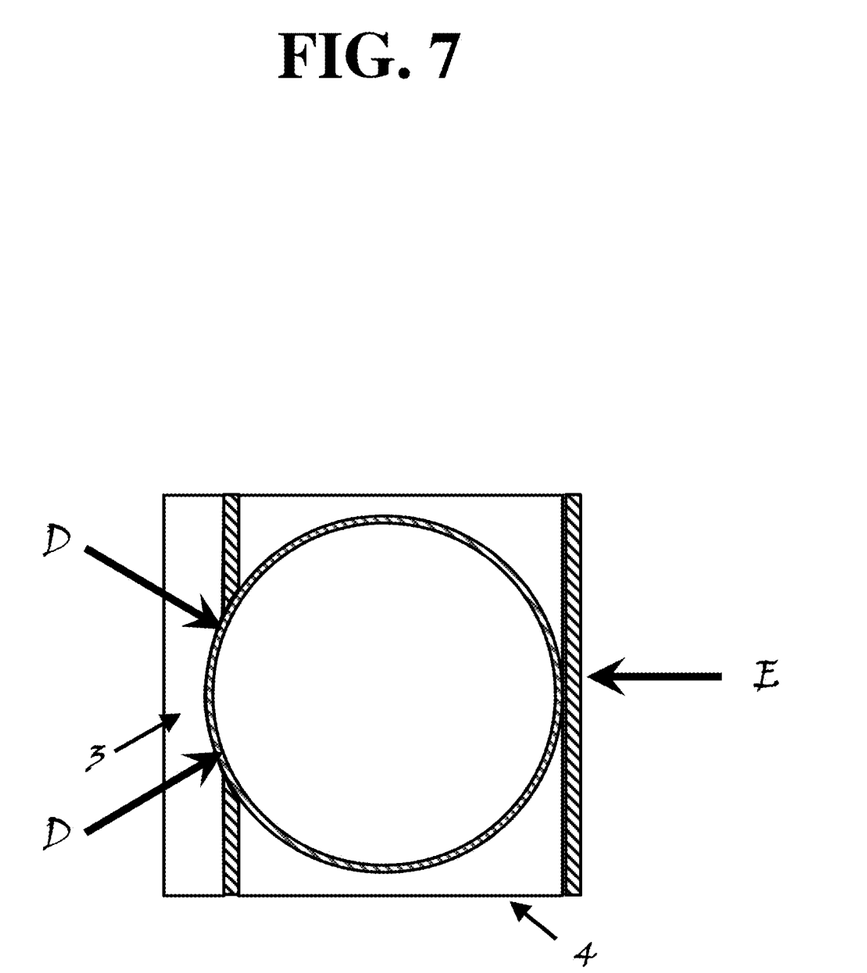
FIG. 7 is a top view of a partial exemplary force diagram noting the engaging forces to secure the weight being supported.

Referring now to FIGS. 6 and 7, additionally, a series of descriptive force or moment vectors are provided in an exemplary cross-sectional view according to the disclosed embodiments. As noted therein force A is the weight of the matter supported, B is the moment transferred to bottom panel 4 by the weight acting on hinge point 10. Similarly force C is transmitted along flexible member 7 in both directions depending upon approach. D is the moment, bending, inwardly against the object being supported based upon further hinge and force transfer matters. E is the force generated by the object against the main panel 3 under support. F is the force of supporting the item on a support member (external). G is the force on top flex member 6 under stress, and H is the moment arm on back panel 7 that provides a gripping, pushing securing stress on the supporting element.

Figure 8:
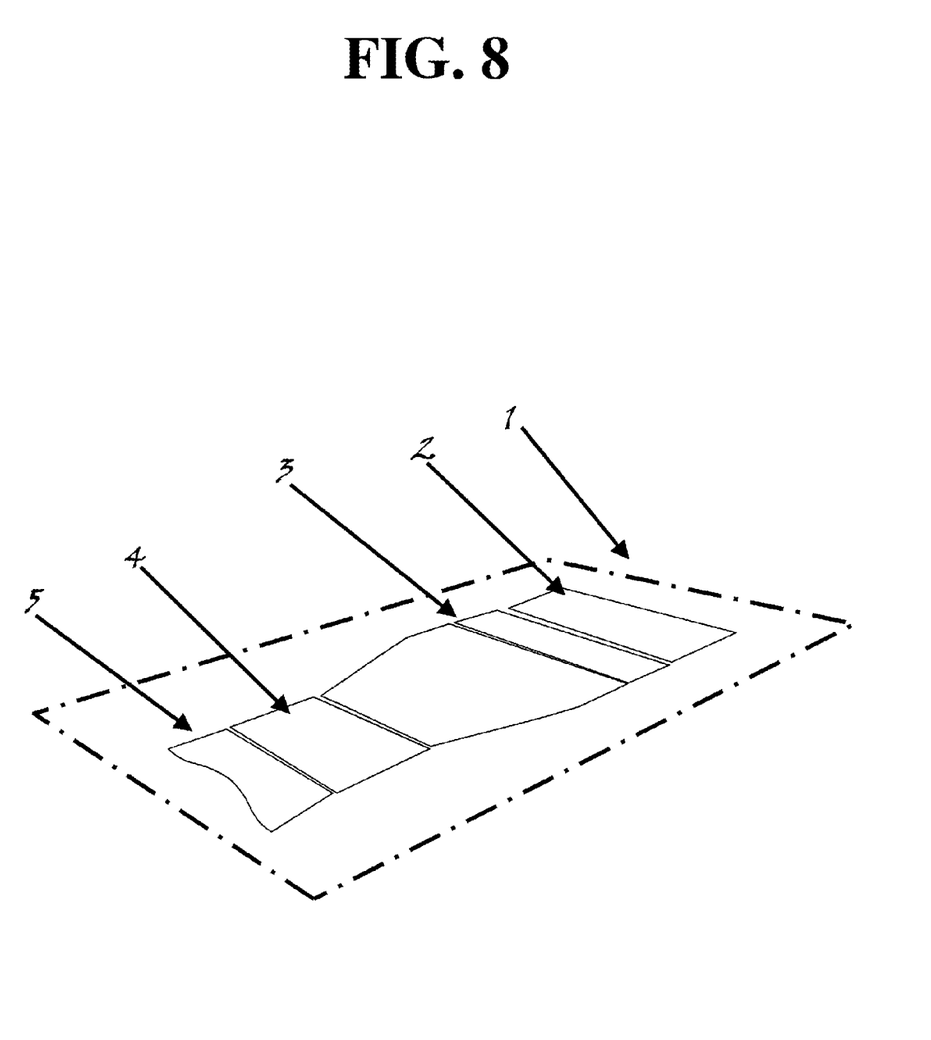
FIG. 8 is a perspective cut arrangement according to the present invention noting the element panels may be cut from a monolithic precursor material.

Referring now to FIG. 8, the elements noted may be aligned on a single panel member prior to cutting or manufacturing. Following cutting, in any proportion, a further step of hinge-creation may be conducted—for example a pressing along the binges on the original cut-out member may be provided to form operative hinge regions. Thereafter, in forming steps, the attachment points maybe formed, and respective flexible members attached along with hinge limiting mechanisms.

Figure 9:
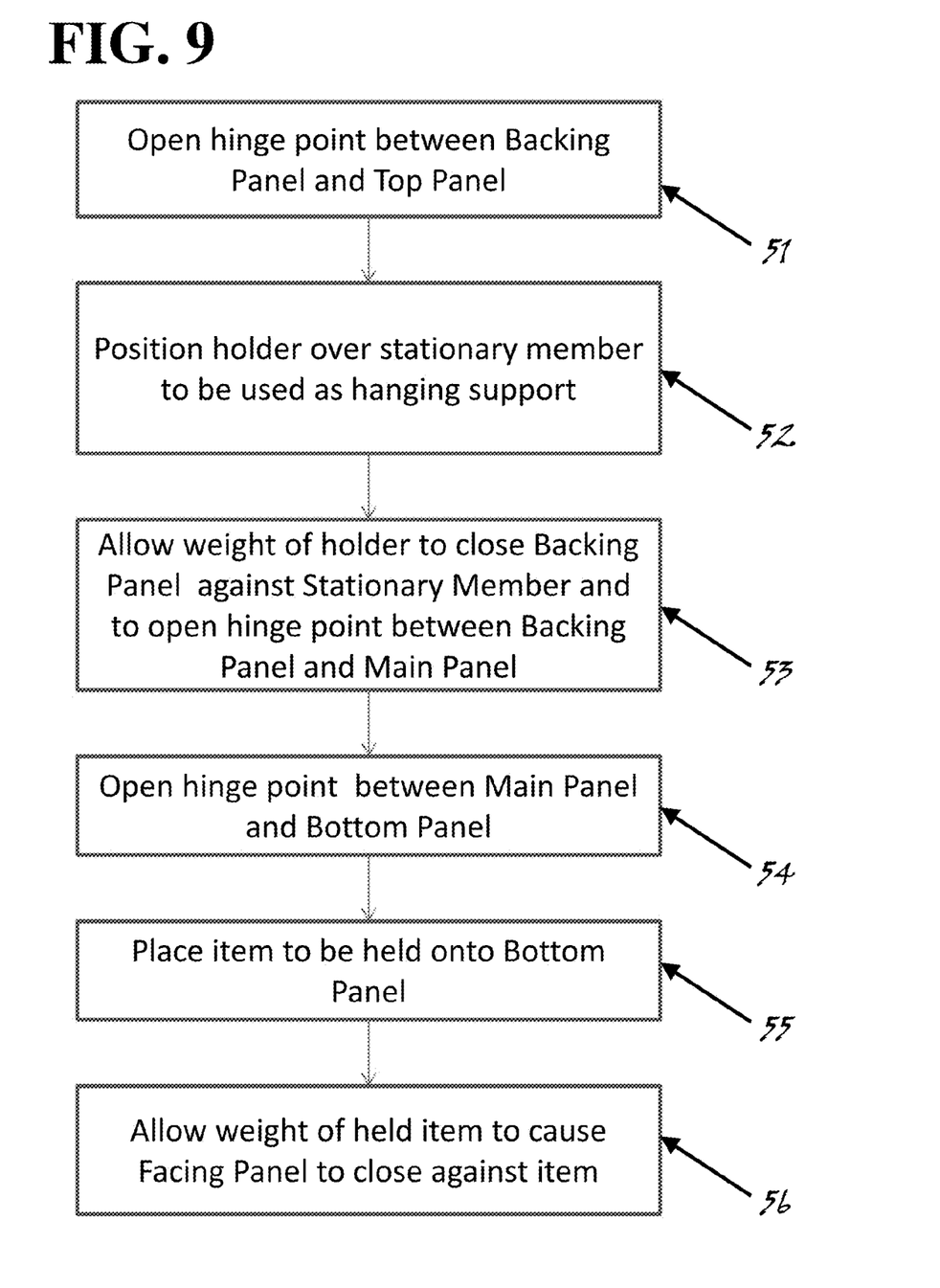
FIG. 9 is a flowchart of the present invention proposing a method of using, the reverse thereof allowing the invention to compact for secure transport.

Referring now to FIG. 9, a flow chart is provided for use steps in opening, positioning, weighing, providing a further hinge opening, placing the item and allowing the weight to secure the item to be held in respective steps 50, 51, 52, 53, 54, and 55, all as shown therein.

Thus, step 50 executes by opening a hinge point between backing panel 1 and top panel 2.

Figure 1:
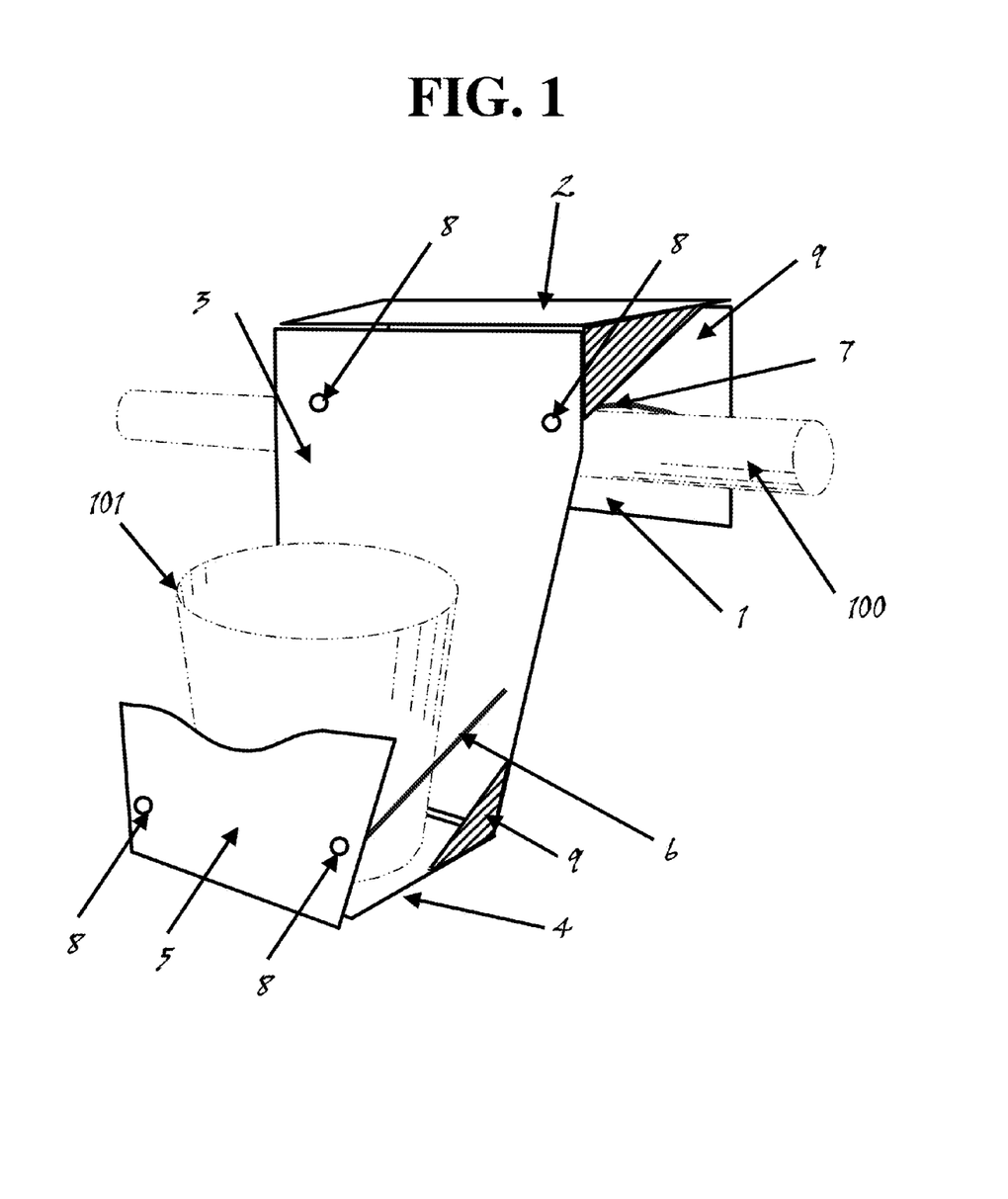
FIG. 1 is a front perspective view of the proposed device engaging a support member and supporting a container, according to the disclosed embodiments.
Figure 2:
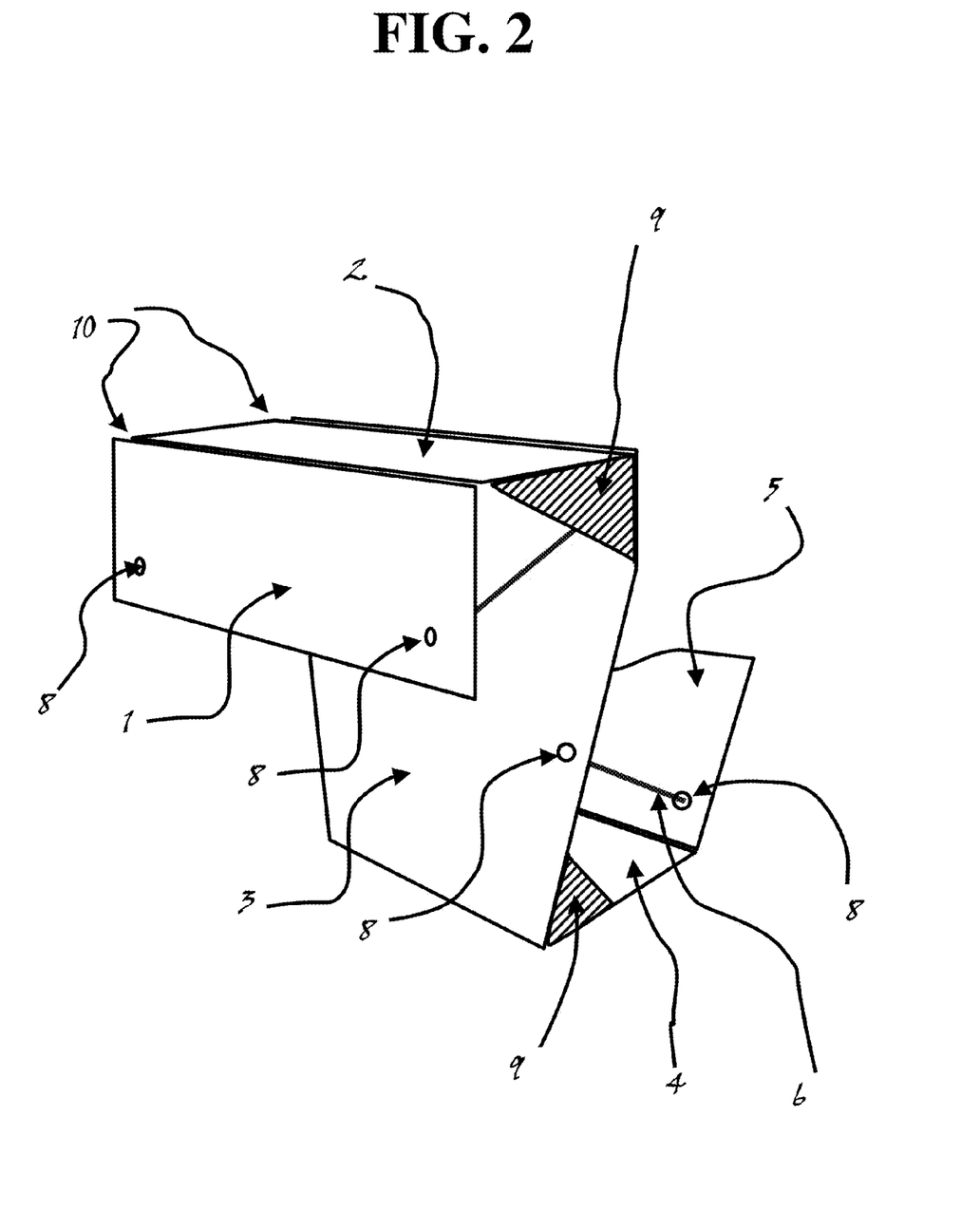
FIG. 2 is a rear perspective view of the proposed device according to FIG. 1.
Figure 3:
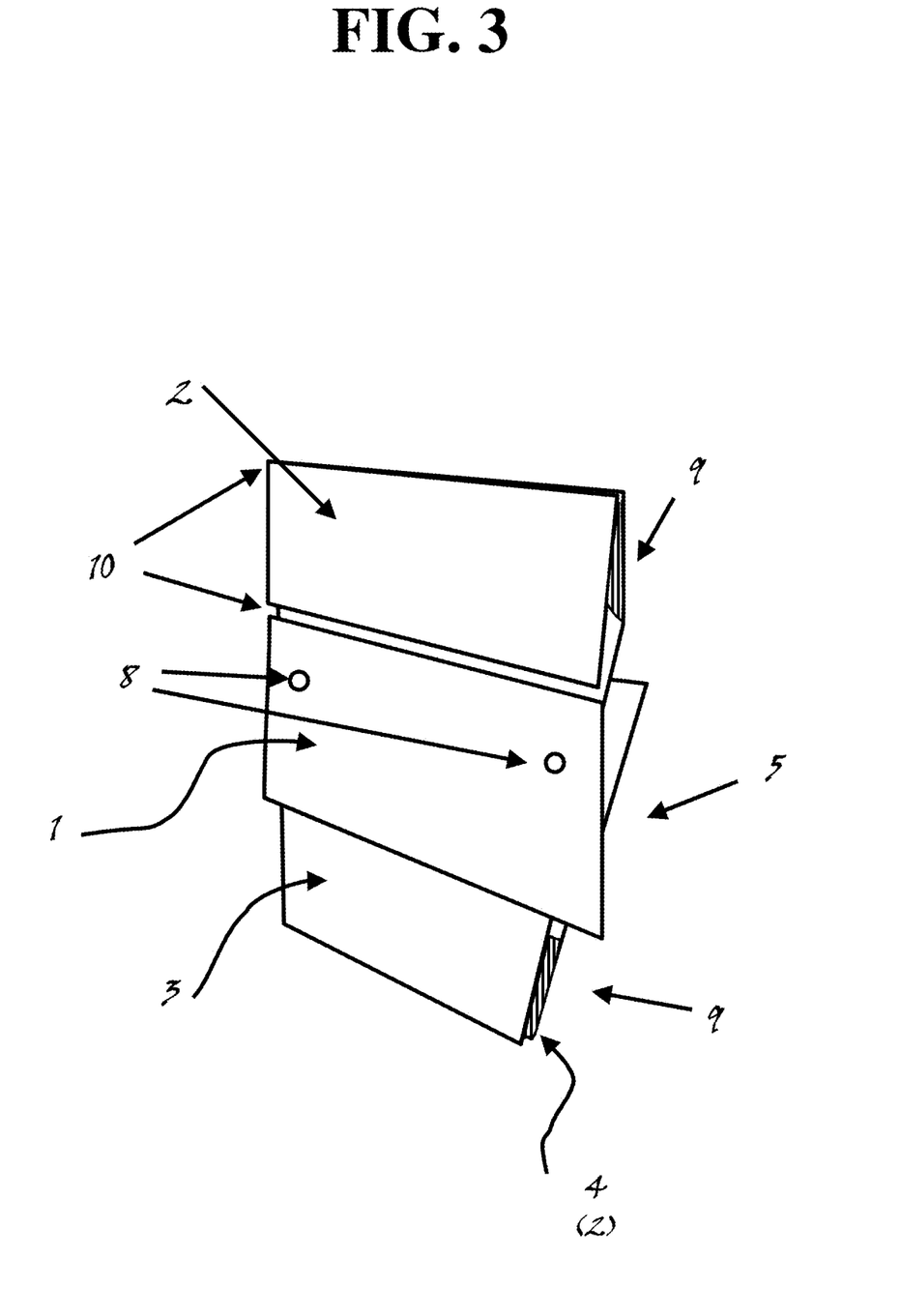
FIG. 3 is a folded perspective view of the embodiment of FIG. 1.
Figure 4:
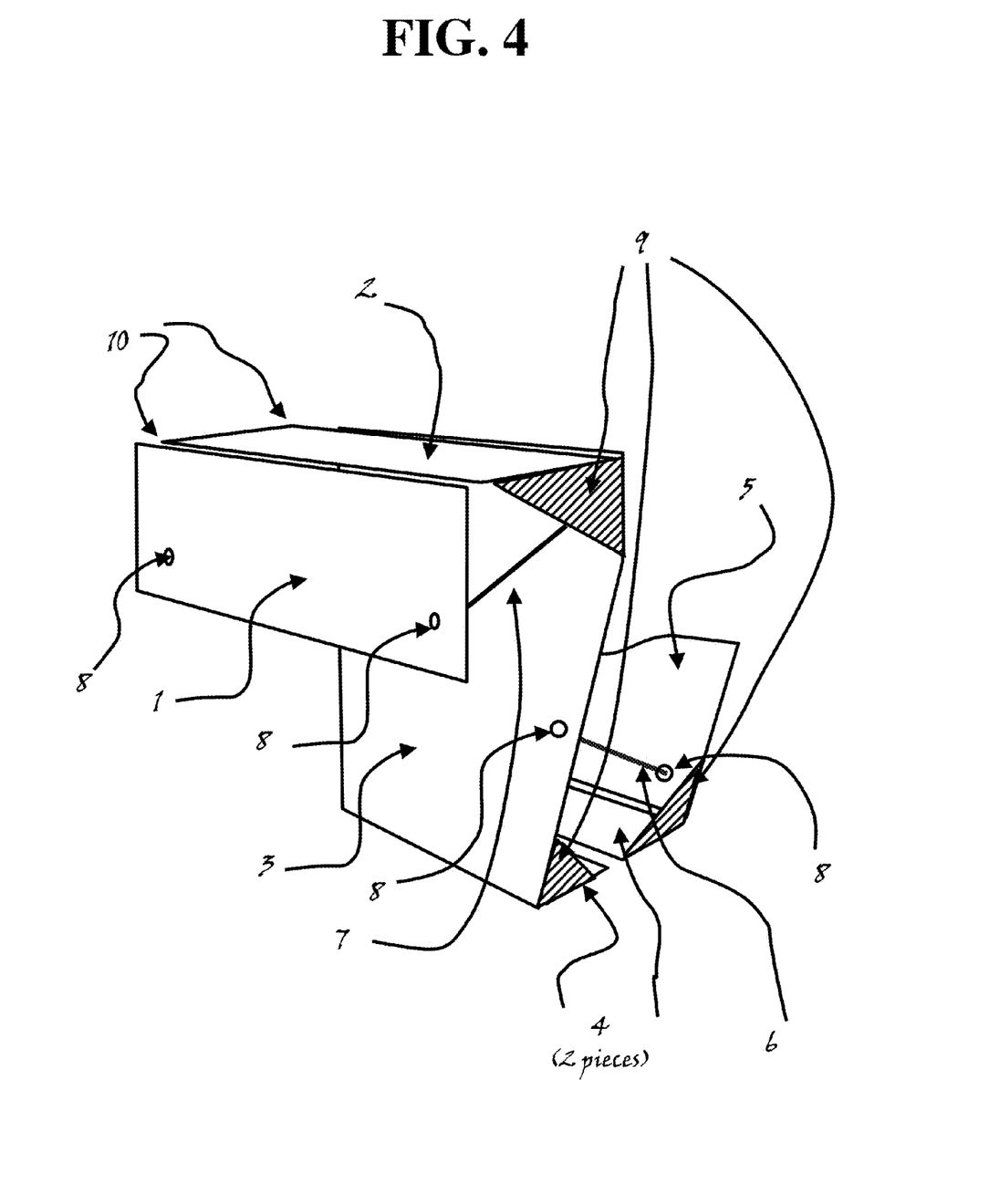
FIG. 4 is a rear perspective view of the proposed device, according to the disclosed embodiments.
Figure 5:
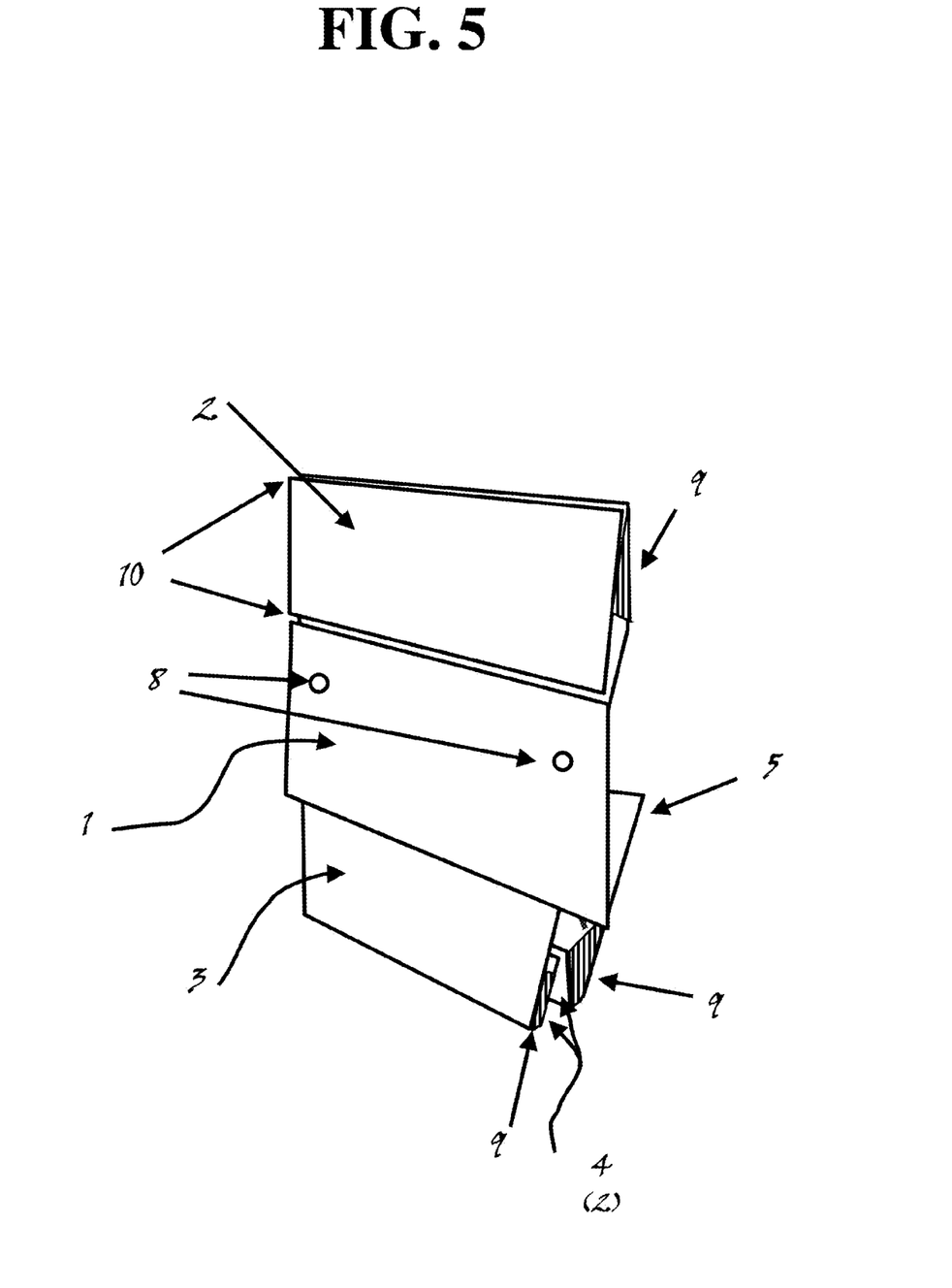
FIG. 5 is a folded perspective view of the embodiment of FIG. 4.

Step 51 executes by positioning the holder over a stationary, or fixed, member 100, shown in FIG. 1, within an environment. The environment may refer to the area on a train, bus or other means of transportation where the user sits. The stationary member 100 is to be used as a hanging support.

Step 52 executes by allowing the weight of the holder to close backing panel 1 against the back or support and to open the hinge point between main panel 3 and facing panel 5.

Step 53 executes by opening the hinge point between bottom panel 4 and main panel 3.

Step 54 executes by placing the item 102, as shown in FIG. 1, to be held onto bottom panel 4.

Step 55 executes by allowing the weight of the item to be held to cause, or pull, facing panel 5 close against the item, thereby securing the item within the holder.

It will also be understood, that the proposed device and methods of assembly or using, may be achieved in different manners now understood by one of skill in the art having previously studied the provided disclosure.

As a further step, it is recognized that the materials may be of any suitable type, without limitation, including for example cellulose products (paper, press board, cardboard etc.), plastic products (plastic panels, cut board, sheet stock etc.) or combinations thereof including metal. Similarly, the components may be of any suitable material.

Finally, it is recognized that advertisement, promotional, and decorative materials may be printed on or provided with the device at a point of purchase or to aid in offsetting the cost of construction of the item.

DRAWING ELEMENT REFERENCE NUMERALS

1.) Backing Panel
2.) Top Panel
3.) Main Panel
4.) Bottom Panel
5.) Facing Panel
6.) Bottom flexible member
7.) Top Flexible Member
8.) Flexible Member Attachment Point
9.) Hinge limiter mechanism
10.) Linear hinge point
100.) Stationary or fixed element
102.) Item to be held Forces Shown on FIGS. 6 and 7

A.) Weight of Object to be supported
B.) Moment transmitted to bottom panel
C.) Force in Bottom flexible member generated by B
D.) Moment transmitted by C resulting in force on the object to be supported
E.) Force generated by object against main panel
F.) Force of supporting environmental element generated by weight (A)
G.) Force on Top Flexible member generated by F
H.) Moment arm on backing panel, pushing against supporting element Method Step Elements 51.) First step of opening hinge
52.) Second step of positioning on a support
53.) Third step of operating the system to secure system to a support
54.) Fourth step of opening hinge point between support elements
55.) Fifth step of placing an item for support by the system
56.) Sixth step of engaging a weight of the item to secure the item on the support Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

The invention claimed is:

1. A folding travel support device, operably securable to an external fixed member, the device comprising:
   a) a substantially flat, rigid backing panel;
   b) a top panel fixed hingedly to the backing panel;
   c) a first limiting mechanism which prevents a hinge between the backing panel and the top panel from opening beyond a certain angle;
   d) a main panel fixed hingedly to the top panel;
   e) a flexible member fixed to the backing panel and the main panel such that a force provided by the fixed member will pull the backing panel toward the main panel;
   f) a bottom panel fixed hingedly to the main panel;
   g) a facing panel fixed hingedly to the bottom panel; and
   h) a flexible member fixed to the facing panel and the main panel such that a force provided by an item to be held will pull the facing panel toward the main panel, thereby trapping the item to be held.

2. The device of claim 1, wherein a top edge of the facing panel includes a curved portion, said curved portion containing a concave portion substantially central to a vertical axis of the facing panel, thereby allowing the facing panel to clasp a curved edge of the item to be held.

3. The device of claim 1, further comprising a second limiting mechanism which prevents a hinge between the main panel and the bottom panel from opening beyond a certain angle.

4. The device of claim 1, wherein the panels comprise a rigid material.

5. The device of claim 4, wherein the rigid material is cut from a single sheet.

6. A method of using the device of claim 1, the method comprising:
   separating the backing panel from the main panel;
   positioning the device such that the backing panel falls on one side of a fixed element in an environment and the main panel falls on another side of the fixed element;
   allowing the device to rest on top of the fixed element, thereby causing the backing panel to be pulled tightly against one side of the fixed element and securing the device to the fixed element;
   separating the facing panel from the main panel;
   placing the item to be supported on the bottom panel of the device; and
   allowing the weight of the item to be held to act upon the bottom panel of the device, and to cause a resulting moment to pull the facing panel tightly against the item.

7. The device of claim 1, wherein hinges join the backing panel to the top panel, the main panel to the top panel, the bottom panel to the main panel, and the facing panel to the main panel.

8. The device of claim 7, wherein the hinges are comprised of a material of the backing panel, the top panel, the main panel, the bottom panel and the facing panel, and further wherein the material is creased to create the hinges.

* * * * *